United States Patent [19]
Takishima et al.

[11] 4,371,243
[45] Feb. 1, 1983

[54] PHOTOGRAPHIC MODE SELECTOR SYSTEM

[75] Inventors: Yoshiyuki Takishima; Masanori Uchidoi, both of Yokohama; Yukio Mashimo, Tokyo; Hiroshi Aizawa, Kawasaki, all of Japan; Stephen C. Kwan, Plano, Tex.

[73] Assignees: Canon Kabushiki Kaisha, Tokyo, Japan; Texas Instruments Incorporated, Tex.

[21] Appl. No.: 298,334

[22] Filed: Aug. 31, 1981

Related U.S. Application Data

[63] Continuation of Ser. No. 64,579, Aug. 7, 1979, abandoned, which is a continuation of Ser. No. 764,272, Jan. 31, 1977, abandoned.

[30] Foreign Application Priority Data

Jan. 30, 1976 [JP] Japan .................... 51-9073

[51] Int. Cl.³ .................... G03B 7/085; G03B 15/05
[52] U.S. Cl. .................... 354/43; 354/50; 354/139; 354/145
[58] Field of Search .................... 354/27, 32, 33, 43, 354/44, 50, 51, 60 R, 60 F, 139, 145, 149

[56] References Cited

U.S. PATENT DOCUMENTS

| | | | |
|---|---|---|---|
| 3,714,872 | 2/1973 | Mashimo et al. | 354/33 |
| 3,821,750 | 6/1974 | Murakami et al. | 354/32 |
| 4,016,575 | 4/1977 | Uchiyama et al. | 354/149 X |
| 4,034,384 | 7/1977 | Tsunekawa et al. | 354/33 |
| 4,047,194 | 9/1977 | Nakamura et al. | 354/27 X |
| 4,126,872 | 11/1978 | Yazaki et al. | 354/149 X |
| 4,187,019 | 2/1980 | Uchiyama et al. | 354/149 X |

*Primary Examiner*—Michael L. Gellner
*Attorney, Agent, or Firm*—Toren, McGeady and Stanger

[57] ABSTRACT

A camera detects which of a number of operating modes is dialed into a flash unit by sensing the current level produced by a source. In response to dialing of a daylight EE mode, the camera measures the brightness of the object to be photographed and conforms the diaphragm aperture to a preselected shutter speed. In one flash mode the flash unit transmits desired aperture and shutter speed data suitable for flash and the camera automatically responds. In another mode, the shutter speed is set into the camera and the camera automatically controls the diaphragm aperture on the basis of data transmitted by the flash unit.

42 Claims, 7 Drawing Figures

PHOTOGRAPHIC MODE SELECTOR SYSTEM

This is a continuation of application, Ser. No. 064,579 filed Aug. 7, 1979 which is a continuation of application, Ser. No. 764,272, filed Jan. 31, 1977, both abandoned.

BACKGROUND OF THE INVENTION

This invention relates to photographic systems, and particularly to cameras with flash units capable of operating in different photographic modes.

Ordinary photographic devices are generally capable of operating in a "daylight" mode in which the photograph is taken with ambient light alone and in an "auxiliary light" or "flash" mode in which a photograph is taken on the basis of light from a flash or on the basis of daylight and auxiliary light.

Furthermore, cameras themselves can perform in daylight in a number of modes. For example a camera may operate in a shutter speed priority mode, according to which the shutter speed is manually dialed and the camera automatically adjusts the diaphragm to an aperture appropriate for the shutter speed, the brightness of the scene, and the object being photographed. A camera may also function in an aperture priority mode, in which a photographer enters a desired aperture value and the camera automatically adjusts the shutter speed to the established aperture and other conditions.

Therefore, a photographer must decide in advance upon a photographic mode and adjust each of the components of a photographic system accordingly. In conventional photographic systems, it is necessary, for selecting the mode, to combine mechanical and electrical switches. This complicates photographic devices and exposes them to damage. Furthermore, electronic switching is susceptible to fluctuations of the voltage source which can result in misoperation.

An object of the invention is to improve photographic devices.

Another object of the invention is to eliminate the aforementioned shortcomings.

Another object of the invention is to permit mode selection despite the effect of fluctuating source voltages and variation in the output of the camera's battery with age.

Another object of the invention is to furnish a separate flash unit which requires a minimum number of connections to the camera and in which the mode is selected with a minimum number of connections.

SUMMARY OF THE INVENTION

According to a feature of the invention, these objects are attained in whole or in part, by generating control signals of various levels with a voltage stabilizing circuit, and operating electronic switching in the appropriate mode in response to one of the levels generated.

According to another feature of the invention, a constant voltage forms a reference signal source that generates switch-over signals having different levels so that the operative mode can be selected by detecting the signal level, demanded of this reference.

According to another feature of the invention, a separable flash unit is interrogated for its mode setting by a single line connected to a constant voltage source in the camera and the answer is transmitted along that line.

These and other features of the invention are pointed out in the claims. Other objects and advantages of the invention will become known from the following detailed description when read in light of the accompanying drawings.

DESCRIPTION OF PREFERRED EMBODIMENTS

Figure 1:
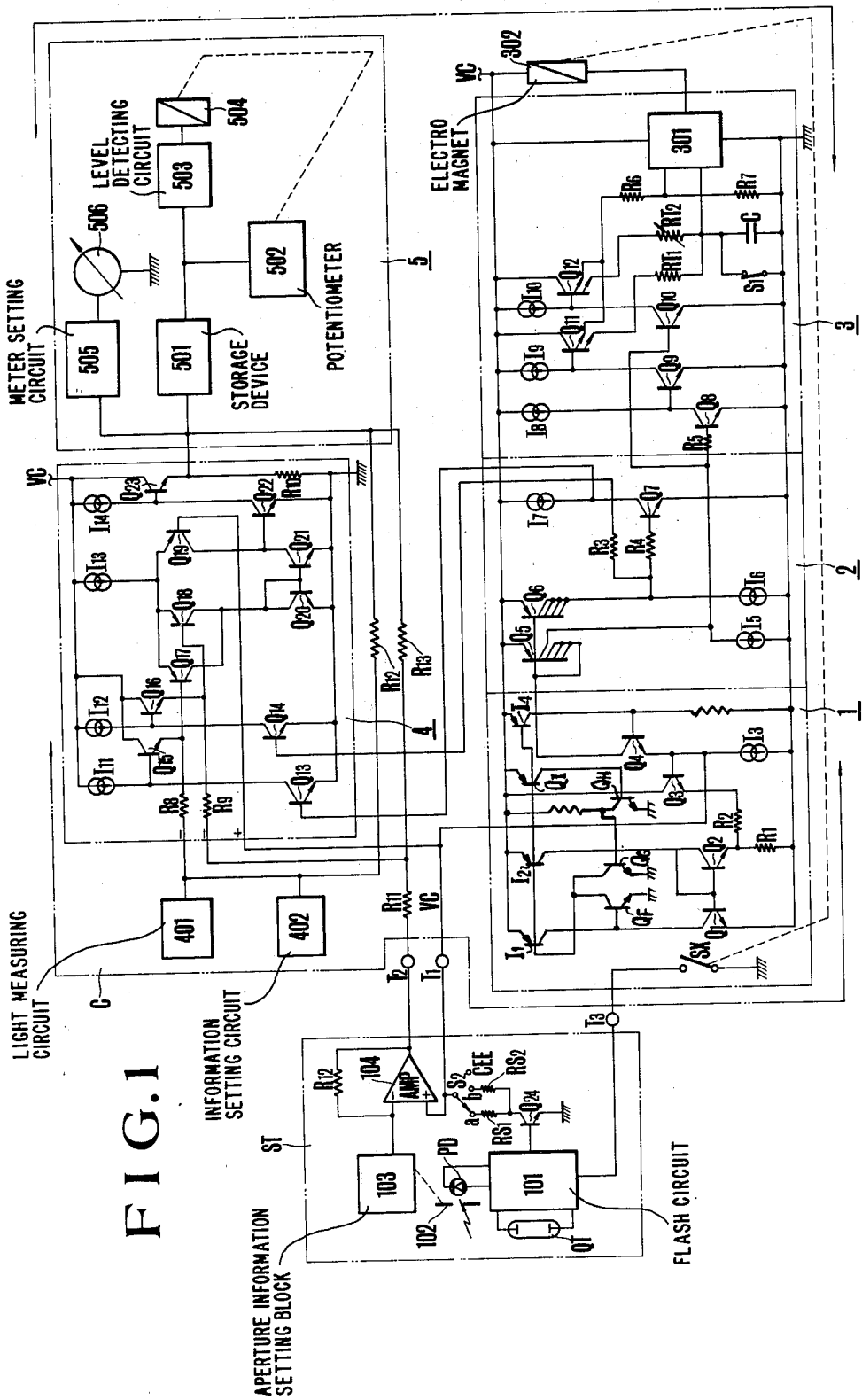
FIG. 1 is a schematic diagram of a camera and flash unit embodying features of the invention.

In FIG. 1, an exposure control circuit C is built into the body of a single lens reflex camera which can be selectively switched between three operating modes. Three camera terminals $T_1$, $T_2$, and $T_3$ connect the control circuit C to a flash unit ST. In the control circuit C, a voltage stabilizing block 1 applies a stabilized reference voltage VC through the terminal $T_1$ to the flash unit ST. The latter generates a mode switching control signal whose current level varies in accordance with one of three desired photographic modes, namely a flash mode, a daylight synchronization mode, or an EE (electric eye) mode.

In the flash mode the camera diaphragm is manually adjusted on the basis of an aperture value established by the flash unit ST. The shutter time is automatically set to a suitable flash photography speed, such as 1/60th of a second. During operation, the flash unit ST senses the light flash reflected from the object being photographed with the set aperture and automatically terminates the flash illumination as soon as a predetermined aggregate or integrated amount of light has been reached.

The daylight synchronization mode differs from the flash mode in that the shutter speed is manually set in advance.

In the EE mode, the shutter speed is manually set. A sensor in the camera measures the brightness of the object to be photographed in response to a signal from the flash unit. The diaphragm is set to an aperture which produces a proper exposure for the preset shutter speed and the ambient daylight.

A current detecting block 2 detects the level of the mode switching signal and automatically switches an electronic switching block 4 into an appropriate mode and also switches the shutter time setting circuit of a shutter time control block 3.

In the voltage stabilizing block 1, four current sources $I_1$, $I_2$, $I_3$, and $I_4$, supply respective currents to four transistors $Q_1$, $Q_2$, $Q_3$, and $Q_4$, transistors $Q_1$ and $Q_2$ have almost identical characteristics. Resistors $R_1$ and $R_2$ form a voltage feedback divider to the emitter of transistor $Q_2$ to establish a "band-gap" reference voltage at the base of transistor $Q_3$.

The current sources $I_1$ and $I_2$, are constructed so that the current $i_1$ of the source $I_1$ is far greater than the current $i_2$ of the current source $I_2$. Thus $i_1 >> i_2$. Preferably $i_1$ is ten times as large as $i_2$. Thus $i_1 = 10 i_2$.

The current sources $I_1$ and $I_2$ supply the transistors $Q_1$ and $Q_2$. We may assume that the base-emitter voltage of the transistor $Q_1$ is $V_{BE1}$ and the base-emitter voltage of the transistor $Q_2$ is $V_{BE2}$. Thus $V_{BE1} = V_{BE2} + \Delta V_{BE}$. The value $\Delta V_{BE}$ represents the voltage drop across the ends of the resistor $R_1$.

In the above k=Boltzmann's constant, T the absolute temperature, and Q the charge of an electron. Since the transistors $Q_1$ and $Q_2$ are matched, and hence their characteristics are substantially equal to each other, $$\Delta V_{BE} = V_{BE1} - V_{BE2} = \frac{kT}{q} \ln \frac{i_1}{i_s} - \frac{kT}{q} \ln \frac{i_2}{i_s}.$$

Here, $i_s$ is the leakage current and $$i_1 = \frac{10}{12} i_2.$$

Thus $$\Delta V_{BE} = \frac{kT}{q} \ln \frac{i_1}{i_2} = \frac{kT}{q} \ln \frac{10}{12} = \text{const}.$$

The current flowing through the resistor $R_1$ is made much larger than the current $I_2$ from the transistor $Q_2$. Thus the current from the transistor $Q_3$ into the resistor $R_1$ through the resistor $R_2$ approximates $$\frac{\Delta V_{BE}}{R_1}.$$

Figure 2A:
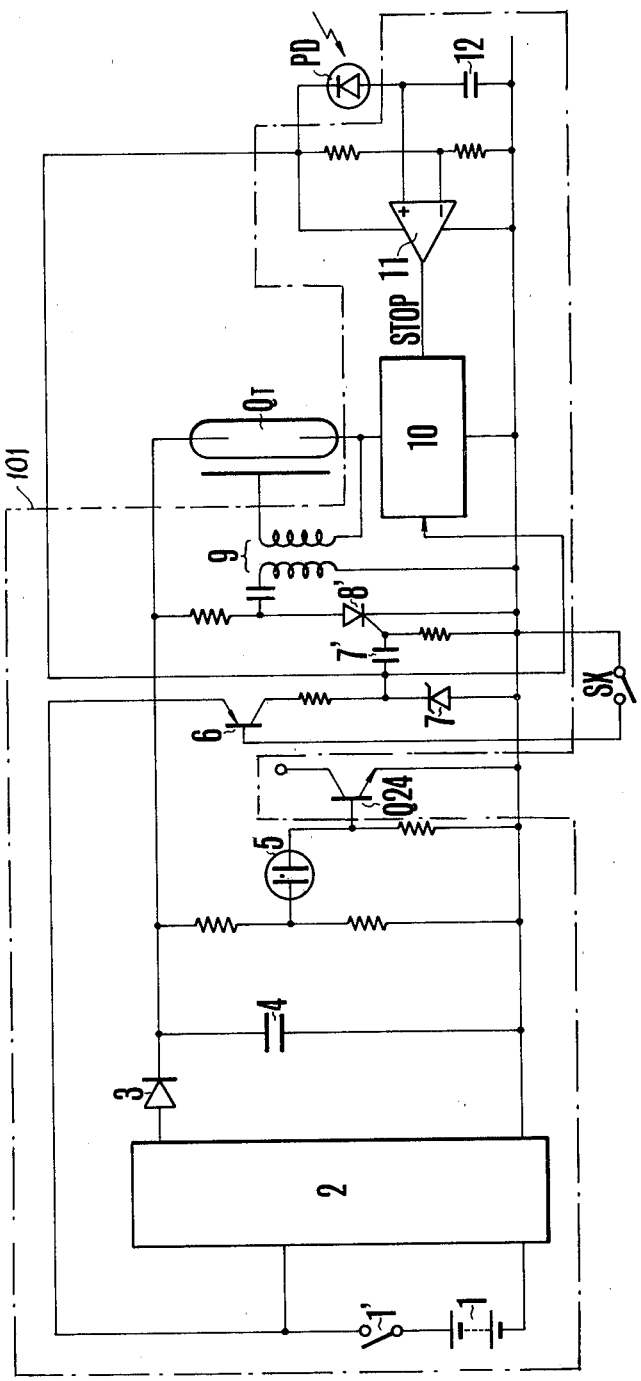
FIGS. 2(a) to 2(b) are schematic diagrams illustrating details of circuit blocks of FIG. 1.
Figure 2B:

Hence the voltage of the emitter of the transistor $Q_3$ is $$\frac{\Delta V_{BE}}{R_1}(R_1 + R_2),$$

while the base voltage of the transistor $Q_3$ is $$\frac{\Delta V_{BE}}{R_1}(R_1 + R_2) + V_{BE3},$$

namely a constant voltage. Here $V_{BE3}$ is the base-emitter voltage of transistor $Q_3$. The constant reference voltage at the base potential of the transistor $Q_3$ is applied by the terminal $T_1$ to the flash unit ST. The transistors $Q_G$, $Q_H$, $Q_I$ constitute the starter circuit of the current sources $I_1, I_2, I_3, Q_F, Q_1$ to $Q_4$. In the flash unit ST a conventional automatic flash actuating circuit 101 shown in FIG. 2(a), energizes and operates a Xenon filled flash tube QT. A diaphragm 102 located in front of a photodiode PD is adjusted in response to a value set into a diaphragm data setting block 103 at the time a photograph is taken. The block 103 is composed of a conventional potentiometer as shown in FIG. 2(b) whose resistance is varied with the diaphragm setting member As shown in FIG. 2(a) the base of the transistor $Q_{24}$ is connected to the terminal of a neon tube that detects the charging voltage across the main capacitor 4 in the control circuit 101. The transistor $Q_{24}$ switches from off to on when the voltage across the main capacitor has charged sufficiently to ready the flash unit for operation.

A photographic mode switch $S_2$ selectively switches a terminal $T_1$ to one of three terminals a, b, and c. Placing the switch $S_2$ at the terminal a sets the unit into the "daylight synchronizing" mode, and energizes the transistor $Q_{24}$ through a resistor $RS_1$. Setting the switch $S_2$ to the terminal b places the unit in the flash mode and energizes the transistor $Q_{24}$ through a resistor $RS_2$. When the switch $S_2$ is set to the terminal c, the transistor $Q_{24}$ is disconnected and the system placed in the EE mode.

The resistor $RS_1$ is chosen to be much larger than the resistor $RS_2$. Thus $$R_{S1} > R_{S2}$$

The current passing through the terminal $T_1$ due to the voltage applied thereto is chosen so that $i_c < i_a < i_b$, where $i_a$, $i_b$ and $i_c$ are respective current values when the switch $S_2$ contacts the terminal a, b and c. therefore, operating the switch $S_2$ establishes each level of the control signal.

The current detecting block 2 of FIG. 1 is composed of current sources $I_5$, $I_6$ and $I_7$, multicollector transistors $Q_5$ and $Q_6$, transistor $Q_7$, and resistors $R_3$ and $R_4$. The transistors $Q_5$ and $Q_6$ form current mirrors to work against the constant current sources $I_5$ and $I_6$. When, as explained, the selector switch $S_2$ of the flash unit ST is set to position c the current level through the terminal $T_1$ is 0. Thus, only a small current passes between the collector and the emitter of the transistor $Q_4$. This current is sufficiently small so that the current mirrors $Q_5$ and $Q_6$ are unable to supply the demand of the constant current sources $I_5$ and $I_6$. Hence transistors $Q_7$, $Q_8$ and $Q_{14}$ are biased off.

When the switch $S_2$ is set to terminal a and the transistor $Q_{24}$ becomes conductive, the control currents from the bases of the transistors $Q_5$ and $Q_6$ flow through the terminal $T_1$ and the collector-emitter of the transistor $Q_4$. Connection of the resistors $RS_1$ into the circuit drives the transistors $Q_5$ and $Q_6$ into conduction. The current through the four collectors of transistors $Q_6$ is sufficient to turn on transistor $Q_7$ and $Q_{14}$ while the current through the one collector of transistor $Q_5$ cannot turn on a transistor $Q_8$. When on the other hand the switch $S_2$ is set at the terminal b, the level of the control current through resistor $Rs_2$ and transistor $Q_{24}$ becomes high enough to cause transistors $Q_5$ and $Q_6$ into higher conduction so that enough emitter-collector current runs through the collectors of the transistors $Q_5$ and $Q_6$ to bias on both the transistor $Q_7$ and the transistor $Q_8$ and $Q_{14}$.

In the time control block 3, transistors $Q_8$ to $Q_{12}$ are energized by constant current sources $I_8$ to $I_{10}$. A shutter time setting resistor $RT_1$ forms an RC circuit with a capacitor C to set a fixed shutter speed in the flash mode. A variable resistor $RT_2$ is manually set by the camera's shutter speed dial not shown. The latter resistor establishes a variable time constant with the capacitor C in the other modes. A switch $S_1$ is closed to short circuit the capacitor C when the camera shutter is wound before a photograph is taken. Operation of the front curtain of the camera's focal plane shutter opens the switch $S_1$. When the switch $S_1$ is opened, the capacitor C begins to charge and a comparison circuit 301 compares the voltage across the capacitor C with the voltage between two resistors $R_6$ and $R_7$. When the capacitor C reaches a predetermined relationship with the voltage at voltage divider $R_6$, $R_7$, the comparison circuit 301 actuates a magnet 302 which releases the rear shutter curtain of the focal plane shutter and closes the shutter.

When mode selector switch $S_2$ is set at the terminal a, transistor $Q_7$ is turned on while transistor $Q_8$ is turned off. This turns on transistor $Q_9$ and turns off transistor $Q_{11}$. At the same time the conditions turning off transistor $Q_8$ also turn off transistor $Q_{10}$ and turn on transistor $Q_{12}$. Therefore, the capacitor C can receive current, and establish a time constant which sets the shutter speed, only with the variable resistor $RT_2$.

On the other hand, when the switch $S_2$ is set to the position b, transistors $Q_8$, $Q_{10}$, and $Q_{11}$ are turned on while transistors $Q_9$ and $Q_{12}$ are turned off. This effectively places the resistor $RT_1$ into a series RC circuit with the capacitor C, and establishes a shutter speed for the flash mode.

In the electronic selector or switchover block 4, resistor $Q_{17}$ and $Q_{18}$ serve as input transistors of a selectable dual channel operational amplifier circuit which includes transistors $Q_{19}$ to $Q_{23}$, current sources $I_{13}$ and $I_{14}$, and resistor $R_{10}$.

Figure 2C:
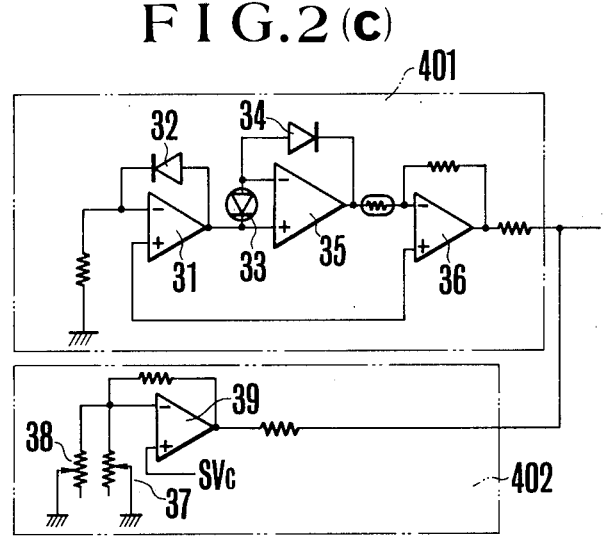

$Q_{13}$ to $Q_{16}$ and current $I_{11}$ and $I_{12}$ respond to the states of transistors $Q_6$ and $Q_7$. A resistor $R_8$ connects the base of the transistor $Q_{17}$ to a conventional light measuring circuit 401 circuit for generating a voltage proportional to the brightness of the object to be photographed. Such a circuit is shown in FIG. 2(c). The transistor $Q_{19}$ is connected with the terminal $T_1$. An information setting circuit 402 is also shown in FIG. 2(c). It is composed of a potentiometer whose value corresponds the shutter time, and means later described for summing the film sensitivity etc. The information setting circuit 402 produces a voltage whose level corresponds to the input data.

Figure 2D:
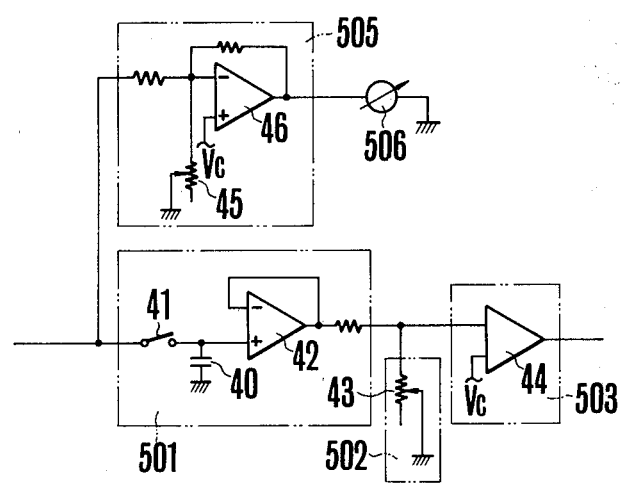

A power transistor $Q_{23}$ in the electronic selector block 4 is connected to a storage device 501 of the control circuit 5. The storage device is formed of any conventional means such as a capacitor, a magnetic core, or an A-D converter with a counter. An example of such a device is shown in FIG. 2(d). A potentiometer 502, also shown in FIG. 2(d) is coupled to and varied by the diaphragm setting member of the camera's diaphragm. A level detecting circuit 503 and a electromagnet 504 for stopping the diaphragm setting member are conventional devices for controlling the camera's diaphragm electromagnetically. A meter circuit 505 and a meter 506 furnish an advance indication of the value of the diaphragm setting.

FIGS. 2(a) to 2(d) illustrate the details of the blocks 101, 103, 401, 402, 501-505 shown in FIG. 1. In FIG. 2(a) the flash circuit 101 includes an electrical source 1, a main switch 1', a step up circuit 2, an rectifying diode 3, main capacitor 4, a neon tube 5, a transistor 6, a Zener diode 7, a capacitor 7', a thyristor 8, a tripper coil 9, a capacitor 12, a comparison circuit 11, and a conventional discharge current control circuit 10. The latter is composed of a thyristor connected in series with the discharge tube QT. to be switched on at the time of triggering. A second thyristor, switched on by means of the comparison circuit 11, discharges a commutating capacitor so as to switch off the first thyrister which is connected in series with QT.

FIG. 2(b) shows the aperture information setting block 103. Here a variable resistance 20 has a value which is coupled to and varied by the camera's aperture setting means not shown.

FIG. 2(c) shows details of the light measuring block 401 and the information setting circuit 402. An operational amplifier 31 and a diode 32 form a bias circuit which biases the light measuring amplifier composed of a light sensing element 33, a diode 34 and an operational amplifier 35. These together with a buffer amplifier 36 form the light measuring circuit block 401. In the formation setting circuit 402, a variable resistor 37 has a value which is varied along with the resistance $RT_2$, namely, it is functionally engaged with the shutter dial. A variable resistor 38 is set to the film senstivity. The resistors 37 and 38 form an input to an operational amplifier 39.

FIG. 2(d) shows an embodiment of the memory device 501, the potentiometer 502 functionally engaged with the aperture adjusting member, the level detecting circuit 503 and a part of the meter circuit 505. Before a picture is taken, a memory capacitor is charged through a conventional memory switch 41 which responds to the SLR camera mirror flipping up in accordance with usual SLR operation. An operational amplifier 42 responds to the charge on capacitor 40. A variable resistance 43 forms the afore mentioned potentiometer 502. A comparison circuit 44 compares the voltage across resistor 43 with the voltage VC. A variable resistor same time the normalized constant voltage within the camera, and between the camera and its external attachments, assures a correct switchover operation and forms an input to an operational amplifier 46.

Figure 3A:
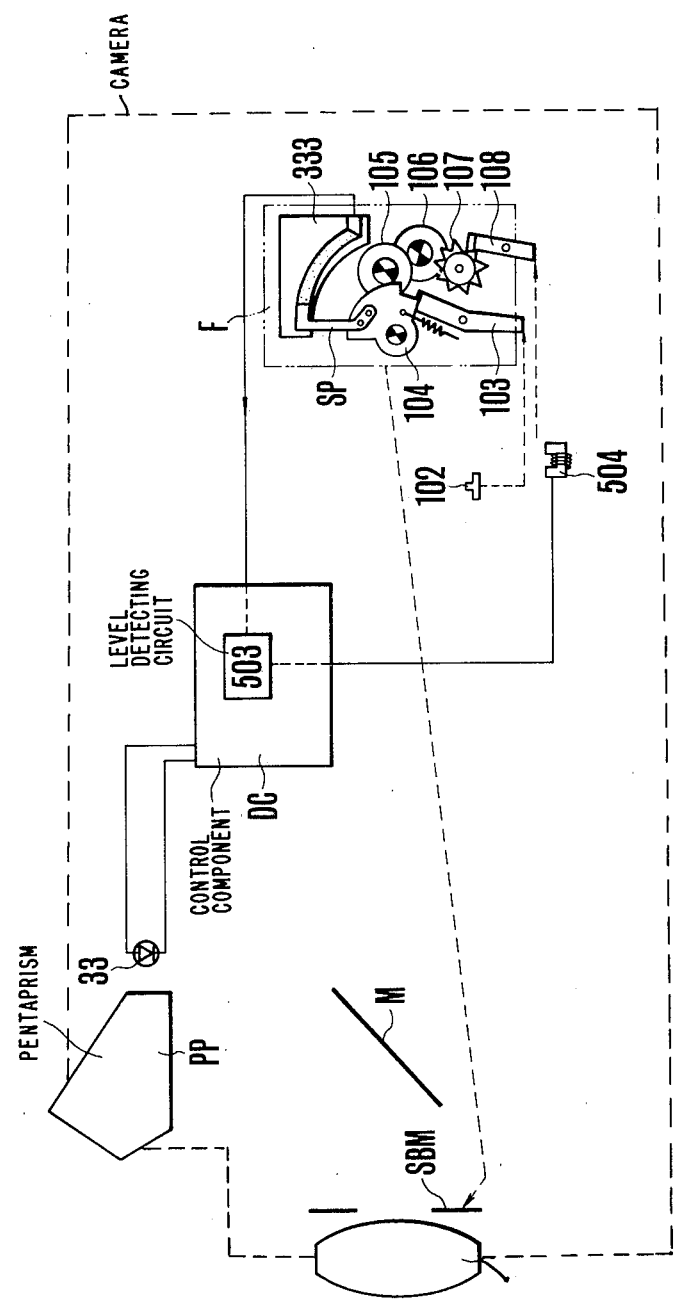
FIGS. 3(a) and 3(b) are partially schematic and partially pictorial diagrams of a shutter control system and a diaphragm control system forming a part of the camera in FIG. 1 and embodying features of the invention.

FIGS. 3(a) and 3(b) illustrate the construction of the aperture setting mechanism of the camera shown in FIG. 1. Here, a hold-release lever 103 is coupled to the shutter release member 10 of the camera. A spring urges a rotary disc 104 in the clockwise direction. The first of a train of step up gears 105, 106, and 107 engages a part of the fan shaped gearing formed along the circumference of the rotary disc 104 and the last gear 107 engages a plunger 108 of the aforementioned magnet 504.

The rotary disc 104 carries electrode SP which slides in elastic contact with the surface of a fan shaped resistance 333 arranged on the frame F fixed on the camera. The resistance 333 and the slide electrode SP constitute the aforementioned potentiometer 43.

As shown in FIG. 3(b), the rotary disc 104 functionally engages a preset ring Pr of the diaphragm in an interchangeable lens L. A preset pin Prc which controls the diaphragm aperture is rotated by the disc 104. This adjusts the position of the pin Prc and presets the aperture. This also determines the maximum clockwise rotation of an aperture ring Sr whose projection SPL strikes the pin Prc as a spring SBB urges the ring clockwise. The ring Sr adjusts the aperture produced by diaphragm blades SBM. A projection Srp at the one end of the ring Sr engages a lever PL. In FIG. 3(a). a lens L admits light through the aperture formed by diaphragm. blades SBm. A mirror M reflects the light toward a pentagonal prism PP. The light sensing element 33 deflects the light and applies it to the component DC which represents the circuits of FIGS. 2(a) to 2(d).

Operation:

In operation, a switch not shown applies a current to each circuit. When the switch over or selector switch $S_2$ is connected with the terminal c for EE operation, the current flowing through the terminal $T_1$ is almost 0. Therefore the current flowing between the collector and emitter of the transistor $Q_4$ and through the transistors $Q_5$ and $Q_6$ is absorbed by the sources $I_5$ and $I_6$. Hence the transistors $Q_7$, $Q_8$ and $Q_{14}$, (the latter in the electronic switchover block 4) remain switched off. The switched off transistor $Q_7$ turns on the transistor $Q_{13}$. In consequence the transistor $Q_{15}$ is turned off. The non-conductive transistor $Q_{14}$ switches on the transistor $Q_{16}$ which biases the transistor $Q_{18}$ off, while the transistor $Q_{17}$ is biased into its active amplifying region. The transistor $Q_{17}$ now amplifies the signals from the light measuring circuit 40 and the setting circuit 402. One of these signals corresponds to the measured brightness and arrives from the amplifier 36 in FIG. 2(c). The other signal corresponds to the shutter time and the film sensitivity and appears at the amplifier 39. The transistor $Q_{18}$ blocks the signals applied to its base. The operational amplifier $Q_{19}$–$Q_{23}$ processes the input to the transistor $Q_{17}$ to produce a signal corresponding to an aperture value at the emitter of $Q_{23}$. The switch 41 of the storage device 501 shown in FIG. 2(d) applies this data across the capacitor 40 where it is stored.

Figure 3:
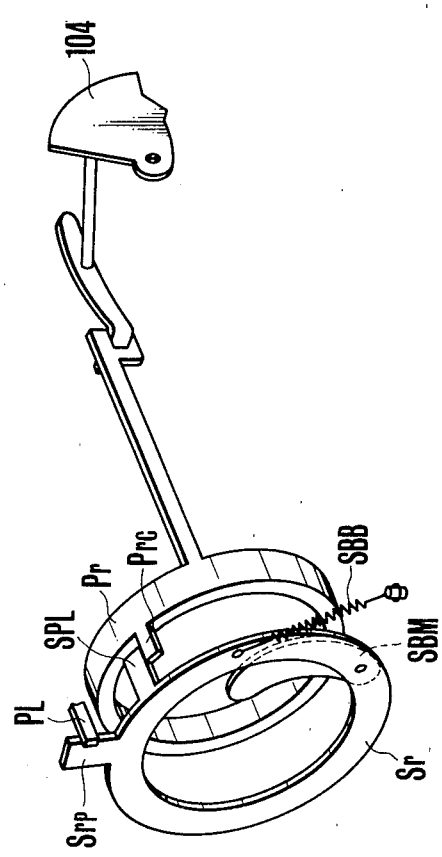

When the aperture value has been thus stored, operation of the shutter release member 102 in FIG. 3 causes the holding member 103 to release the rotary disc 104. The spring now rotates the rotary disc 104 clockwise so that the value of the resistor 43 gradually decreases from a maximum value until the value coincides with the bias signal Vc at the other input shown in FIG. 2(d). This coincidence causes the amplifier 44 to operate the magnet 504. The magnet then holds the wheel 107 with the plunger 108 so that the rotary disc 104 stops rotating and positions the preset pin Prc.

When the release member 102 is further depressed by the photographer, a conventional release mechanism, not shown, releases the driving mechanism of the flip-up SLR mirror and disengages the lever PL in FIG. 3 from the projection Srp. The aperture ring Sr then rotates in response to tension from the spring SSB while the mirror flips up. The rotation of ring Sr continues until the projection SPL strikes the pin Prc. This sets the aperture of the diaphragm at a value determined by the pin Prc while the flip-up of the mirror M opens the switch 41. The then existing aperture value is displayed by the meter 506.

The aperture can be controlled in this way while the emitter-collector current of the transistor $Q_5$ is sufficiently small to keep the transistor $Q_8$ and $Q_{10}$ off while the transistors $Q_9$ and $Q_{12}$ are turned on while the transistor $Q_{11}$ is off. These conditions select the resistor $RT_2$.

When the release member 102 is further depressed by the photographer, the shutter operates by releasing the front shutter curtain. This opens the switch $S_1$. The capacitor C begins to charge. When the capacitor C has charged sufficiently, the comparison circuit 301 deenergizes the magnet 302. This allows the rear shutter curtain to run and complete the photograph at the time set by the resistance $RT_2$.

In the daylight synchronization mode, current is supplied to every circuit in the same way as in the EE mode. The selector switch $S_2$ is turned to the terminal a and the main switch 1' of the flash unit shown in FIG. 2(a) is closed. As a result, the main capacitor 4 is charged to a predetermined value at which it energizes the neon tube 5. This switches on the transistor $Q_{24}$. The current $i_a$ which flows through the resistor $RS_1$ and the transistor $Q_{24}$ is such as to turn on transistors $Q_7$ and $Q_{14}$ while switching transistor $Q_8$ off. The off transistor $Q_8$ prevents the shutter time circuit 3 from operating in response to the value of resistor $RT_1$. On the other hand, the on transistor $Q_7$ turns off transistor $Q_{13}$, which turns on transistor $Q_{15}$, which switches transistor $Q_{17}$ off. At the same time, the transistor $Q_{14}$, which is on, turns off transistor $Q_{16}$ thereby allowing, transistor $Q_{18}$ to operate into its active amplifying range. As a result, the amplifying system of transistors $Q_{19}$, $Q_{20}$, and $Q_{21}$ operate in response to transistor $Q_{18}$.

The input to the transistor $Q_{18}$ is a signal corresponding to the aperture value set by the resistor 20 in the aperture information block 103 of the flash unit ST so as to operate with the flash. This value is delivered to transistor $Q_{18}$ through the amplifier 104 and the terminal $T_2$. The information is processed and stored in the capacitor 40 of the storage unit 501 in the same manner as described with respect to operation in the EE mode. Hence, the diaphragm is set by the resistor 20 in the information setting circuit under the control of control circuit 5 in the same way as that for the EE mode.

In the flash mode, because the transistor $Q_{17}$ is switched off, no data from the light measuring circuit 401 and the data setting circuit 402 is delivered to the storage circuit 501. When the camera is actuated the diaphragm is moved the same way as in the EE mode. When the operator releases the shutter the front shutter curtain starts running and closes the synchronizing switch Sx in FIG. 2(a) which is engaged thereto. The transistor 6 now turns on and establishes a predetermined voltage across the Zener diode 7. The capacitor 7' responds to the voltage across the diode 7 and switches on the thyristor 8' which actuates the trigger coil 9. At the same time, the thyristor located in the control circuit 10 and in series with the discharge tube QT is turned on and the trigger pulse through the transformer 9 ignites the discharge tube QT.

The light flash is reflected by the object to be photographed and the light sensing element PD responds to the reflected light to charge the capacitor 12 to a value corresponding to the total light quantity sensed up to any particular moment. When the charge across the capacitor 12 reaches a threshold value, the comparator circuit switches to produce a signal. The signal from the circuit 11 actuates a second thyristor in the circuit 10 which discharges the commutating capacitor and turns off the thyristor in series with the tube QT. At the same time, the resistor $RT_2$ is selected to close the shutter after an elapse of time manually set at the resistor $RT_2$, during which the exposure is carried out in daylight, i.e., during operation in the daylight synchronization mode.

In the flash mode, current is also supplied to all of the circuits in the same manner as in the EE mode. The selector switch $S_2$ is set to position b. The flash unit becomes operable and the transistor $Q_{24}$ is turned on in the same manner as in the daylight synchronization mode. However, the resistor $RS_2$ is such as to allow a high level control current to flow between the emitter and collector of the transistor $Q_4$. Consequently, the reflected currents of the transistors $Q_5$ and $Q_6$ exceed the constant current sources $I_5$ and $I_6$. As a result, both transistors $Q_7$ and $Q_8$ are switched on. This keeps the circuit 4 in the same condition as in the daylight synchronization mode. That is, the off transistor Q17 cuts off the light measuring circuit 401 and the data setting circuit 402 from the storage device 501. The on transistor $Q_{18}$ of the switch overblock 4 passes only the aperture data signal from the flash unit ST to the capacitor 40 of the storage unit 501.

Switching transistor $Q_8$ on turns off transistor $Q_9$ and turns on transistor $Q_{11}$. At the same time the signal which turns on transistor $Q_8$ also turns on transistor $Q_{10}$ and therefore switches off transistor $Q_{12}$. Hence, current can flow to the capacitor C only through the resistor $RT_1$. The value of the resistor $RT_1$ corresponds to a shutter time suitable for flash operation, such as 1/60th of a second. This resistor, like the resistor $RT_2$ is also connected in series with the capacitor C to form a time constant circuit therewith. When the camera is operated, the diaphragm is set as mentioned above at the set aperture value so that the shutter responds to the resistor $RT_1$ which sets a speed suitable for the flash mode.

The present invention selects the photographic mode by utilizing a level varying current from a constant voltage source for switching between modes so that the number of signal carrying wires for the selection operation can be made small, while at the same time the normalized constant voltage within the camera, and between the camera and its external attachments, assures a correct switchover operation despite noises or fluctuations in the power source. This is very important in photographic devices in which batteries provide the sole source of power.

The step-up circuit 2 of FIG. 2(a) is in the form of a DC to AC inverter which together with the diode 3 forms a DC to DC converter. Such inverters and converters are well known in the art and described in detail in the Transistor Manual published by the General Electric Company, originally printed in 1964 and revised in 1969 on pages 234 to 239. In the DC to DC converter, on page 237, a full wave bridge circuit forms the output from the DC to AC inverter. It will be recognized that a diode such as the diode 3 can be substituted for this full wave rectifier.

The circuit 10 is in the form of a commutated SCR circuit such as that disclosed in the SCR Manual, fourth Edition, published by the General Electrical Company in 1967, page 96. The flash tube QT is utilized as one of the leads shown in this illustration; and also the circuit 10 is well known in the art and described in detail in U.S. Pat. No. Re. 28025 issued May 28, 1974 in FIG. 3.

While specific embodiments of the invention have been shown and described in detail to illustrate the application of the inventive principles, it will be understood that the invention may be embodied otherwise without departing from such principles. In the equations, K is Boltzmann's constant, T is the absolute temperature, and Q is the charge of an electron.

The transistor of forms A feedback signal which further stabilizes the voltage at the base of transistor Q.

Current mirrors and their operation are disclosed in U.S. Pat. No. 3,835,410 dated Sept. 10, 1974. The resistors $R_1$ and $R_2$, in cooperation with the transistors $Q_1$ to $Q_4$ and of establish a "band-gap" reference voltage at the base of transistor $Q_3$. The structure and operation of band-gap references is disclosed in the IEEE Journal of Solid State Circuits Vol. SC9, No. 6, entitled "A SIMPLE THREE-TERMINAL BAND-GAP REFERENCE", and also in copending patent application Ser. No. 737,134 filed Oct. 29, 1976 of Stephen Kwan. According to other embodiments of the invention, the aforementioned circuits are substituted for those shown and described.

What is claimed is:

1. A camera operable with an automatic flash unit, comprising:
   a diaphragm variable in response to electrical input signals,
   a shutter having means for selecting a flash shutter time suitable for flash operation and having means for selecting settable shutter times,
   a control circuit responsive to light and the set times of said means for selecting settable shutter times, for producing a control signal,
   an input for responding to a variable diaphragm signal from the flash unit,
   sensor means for sensing three levels of current in response to external signals and for maintaining the current levels constant, and
   mode selector means coupled to said sensor means for connecting the control circuit to the variable diaphragm and enabling the means for selecting settable shutter times in response to one of the current levels, for applying the input signals to the diaphragm and enabling the means for selecting settable shutter times in the shutter in response to another of said current levels, and for connecting the input to the diaphragm and for enabling the means for selecting a flash shutter time in the shutter in response to still another of the current levels.

2. A camera for use with an automatic flash and operable in three modes, comprising:
   (a) a diaphragm having a variable aperture;
   (b) a diaphragm control for responding to an input signal from the flash;
   (c) a light measuring circuit for forming an output corresponding to the measured brightness;
   (d) a shutter control mechanism for controlling the shutter;
   (e) a shutter control circuit coupled to said shutter control mechanism, operable in a preset shutter mode for controlling the shutter time based on a preset shutter time and in a flash mode for controlling the shutter time suitable for flash operation; and
   (f) an electronic switchover and selecting circuit responsive to a control signal having a first constant current level for connecting said light measuring circuit to said diaphragm control circuit to apply the output of said light measuring circuit to said diaphragm control circuit and selecting the preset shutter mode of the shutter control circuit, said electronic switchover and selecting circuit being responsive to a mode control signal having a second constant current level different from said first constant current level for applying said input signal to said diaphragm control circuit and selecting the preset shutter mode of said shutter control circuit, and said electronic switchover and selecting circuit being responsive to a mode control signal having a third constant current level different from said first and second constant levels for applying said input signal to said diaphragm control circuit and selecting said flash mode of said shutter control circuit.

3. A camera as in claim 2, further comprising a current forming circuit for forming the first and second as well as third constant current levels, said constant current forming circuit being responsive to voltages applied thereto.

4. A system as in claim 2, wherein said shutter control circuit includes a preset time constant circuit for operation in the preset shutter mode and having a time constant corresponding to a preset shutter time, a flash time constant circuit having a time constant corresponding to a shutter time suitable for flash operation for controlling the shutter time suitable for flash operation, and a shutter circuit coupled to the shutter for controlling the shutter time on the basis of the output of one of said time constant circuits.

5. A camera as in claim 2, wherein said diaphragm control includes an aperture setting mechanism for controlling the diaphragm.

6. A photographic system comprising:

(a) An electric flash unit having a shoe and comprising:
1. an aperture signal forming circuit for forming an output corresponding to an aperture suitable for flash operation;
2. a selector circuit for forming flash, synchronizing and daylight selector signals having respective constant current levels different from each other for respective flash, daylight synchronization, and daylight operations;
3. selection means coupled to the selector circuit for selecting one of the levels;
4. a first terminal at the shoe of the flash unit for transmitting the output from the aperture signal forming circuit to a camera;
5. a second terminal at the shoe of the flash unit, said second terminal being connected to the selector circuit;

(b) A camera including a shoe and having:
1. a third terminal at the shoe for connection to the first terminal when the flash unit is coupled to the camera;
2. a fourth terminal at the shoe for connection to the second terminal when the flash unit is coupled to the camera;
3. a light measuring circuit for producing an output corresponding to the brightness of an object to be photographed;
4. a diaphragm mechanism having an adjustable aperture;
5. an aperture control circuit coupled to the diaphragm mechanism for controlling the aperture of said diaphragm mechanism;
6. a shutter mechanism;
7. a shutter control circuit coupled to said shutter mechanism and having a set mode for controlling the shutter time based on a settable shutter time and a flash mode for controlling the shutter time for flash operation;
8. a constant voltage circuit for producing a constant voltage, said selector circuit being coupled to the constant voltage circuit through said fourth and second terminals when the flash unit is coupled to the camera so that said selector signals are formed on the basis of the constant voltage;
9. an electronic switching circuit having first and second input terminals, said first input terminal being coupled to the aperture signal forming circuit through said first and third terminal when the flash unit is coupled to the camera, and said second input terminal being coupled to the selector circuit through said second and fourth terminal when the flash unit is coupled to the camera, said circuit being arranged for coupling the light measuring circuit to the aperture control circuit and selecting a set mode in response to the flash level of the selector signal for daylight operation and for coupling the aperture signal forming circuit to the aperture control circuit and selecting a set mode in response to the synchronizing level of the selector signal different from the first level for daylight synchronization operation and for coupling the aperture signal forming circuit to the aperture control circuit and for selecting a flash mode in response to the daylight level of the selector signal different from the first and second level for flash operation.

7. A system as in claim 6, wherein said selector circuit includes daylight output means for producing a selector signal having a level for daylight operation and having additional output means for producing the flash and synchronization signals having at least one other level different from said daylight level at least for flash operation.

8. A system as in claim 7, wherein said additional output means produces said daylight and synchronization signals having a plurality of levels each indicative of daylight synchronization and flash operation.

9. A system as in claim 6, wherein said shutter control circuit includes:
a preset time constant circuit having a time constant corresponding to a preset shutter time,
a flash time constant circuit having a time constant corresponding to a shutter time suitable for flash operation,
a shutter circuit coupled to the shutter for controlling the shutter time on the basis of the output of one of said time constant circuits, and
said electronic switching circuit including switch means coupled to said preset and flash time constant circuits as well as to said shutter circuit for coupling said preset time constant circuit to said shutter circuit in response to the levels of selector signals indicative of daylight and synchronization operation and to said flash time constant circuit in response to the level of said selector signal indicative of flash operation.

10. A system as in claim 6, wherein said flash unit includes completion indicating means for producing a charge completion signal when the unit is ready for operation, and operation control means connected to said completion indicating means and to said selector circuit for causing said selector circuit to initiate production of the selector signals of one of the levels when said completion indicating means produces said charge completion indication.

11. A system as in claim 6, wherein
said flash unit includes a flash discharge tube and storage means connected to said flash discharge tube for storing energy to operate the flash discharge tube,
said flash unit further includes switch means coupled to said storage means for detecting the energy stored in said storage means and for becoming operative when the energy has reached a predetermined level,
said selector circuit including a plurality of impedance means, each impedance means having values different from the other, a plurality of said impedance means being connected to said switch means,
said selection means coupling a selected one of said impedance means to said constant voltage circuit, when the flash unit is coupled to the camera, and thereby selecting one of the constant current levels, the constant current level for flash or daylight synchronization being produced when said switch means becomes operative and said impedance means connected to the switch means is selected.

12. A system as in claim 6, wherein said selector circuit includes impedance control means having a plurality of different impedances, said constant voltage circuit being selectively connected to said impedances to form levels in the form of different current levels.

13. A photographic mode control system for a camera having a shutter and diaphragm aperture, comprising:
  (a) a camera including:
    1. an exposure control circuit switchable to operate in a daylight mode for producing an exposure with a suitable shutter time and aperture value for daylight photography and to operate in a flash mode for producing an exposure with a suitable shutter time and aperture value for flash photography and to operate in a daylight synchronization mode for producing an exposure with a suitable shutter time and aperture value for daylight synchronization photography;
    2. a constant voltage source for producing an output of constant voltage, said output of constant voltage being applied to the exposure control circuit as a bias voltage;
    3. an electronic switchover circuit connected to the exposure control circuit for switching said exposure control circuit into the daylight mode in response to a second level of current and into the daylight synchronization mode in response to a third level of current;
    4. a first terminal in the camera, said terminal being connected to the constant voltage source and the electronic switchover circuit;
  (b) a flash unit including:
    1. a second terminal connected to said first terminal when the camera is coupled to the flash unit;
    2. a signal forming circuit connected and responsive to the source through said first and second terminals for producing a selector signal having one of a plurality of different constant levels of current, said circuit including daylight signal forming means for producing a level of current indicative of daylight operation, daylight synchronization signal forming means for producing a level of current, the level of said daylight signal forming means and indicative of daylight synchronization operation, flash signal forming means for producing a level of current and different from the levels of said daylight signal forming means and said synchronization signal forming means indicative of flash operation, and selection means coupleable to one of said signal forming means for selecting one of said signal forming means so as to selectively switch to one of a flash and daylight operating mode and daylight synchronization mode.

14. A circuit as in claim 13, wherein said exposure control circuit includes a light measuring circuit for producing an output corresponding to the brightness of an object to be photographed, a diaphragm control circuit for controlling the diaphragm aperture, and said flash unit including an aperture signal forming circuit for producing an output corresponding to a desired aperture value for flash operation, said electronic switching circuit including a switching circuit coupled to the diaphragm control circuit for connecting the aperture signal forming circuit to the diaphragm control circuit in response to the levels for flash and daylight synchronization operations, and the light measuring circuit to the diaphragm control circuit in response to the level for daylight operation.

15. A circuit as in claim 14, wherein said exposure control circuit includes set shutter control means for producing a shutter speed signal corresponding to a set shutter speed, flash shutter control means for producing a second shutter speed signal corresponding to a shutter speed suitable for flash operation, and a shutter control circuit for controlling the shutter speed, said electronic switching circuit including switching means for enablish said set shutter control means in response to levels for daylight and daylight synchronization operation and for enabling the flash shutter control means in response to the level for flash operation.

16. A system as in claim 13, wherein each of said signal forming means includes impedances different from each other, said selection means selectively connecting said impedances to said constant voltage source so as to form respective currents corresponding to the levels.

17. A flash camera, comprising:
  a shutter mechanism,
  a shutter speed control circuit coupled to said shutter mechanism and including a daylight shutter speed control to control the shutter for daylight operation and a flash speed shutter control to control the shutter for flash operation,
  a diaphragm aperture mechanism,
  means for receiving an input signal,
  an aperture control circuit coupled to said diaphragm aperture mechanism, said circuit including a daylight aperture control for controlling the aperture value for daylight operation and a flash aperture value control for controlling the aperture value for flash operation,
  an electronic selector circuit coupled to said shutter speed control circuit and aperture control circuit and responsive to an input signal of predetermined constant current level for selectively activating one of said shutter speed controls and one of said aperture value controls, said daylight shutter speed control for daylight operation and said daylight aperture value control for daylight operation being activated by a constant level of current and said daylight shutter speed control for daylight operation and said flash aperture control for flash operation being activated by another constant level of current different from said first constant level and said flash shutter speed control for flash operation and flash aperture value control for flash operation being activated by yet another level of current different from the other two constant levels.

18. A photographic system comprising:
  (A) An electric flash unit including:
    1. an aperture signal forming circuit for forming an output corresponding to an aperture value suitable for flash operation;
    2. a selector circuit for forming three selector signals having respectively different constant current levels, said circuit including three impedance means having respectively different impedance values;
    3. selection means for selecting one of said impedance means;
    4. a shoe, a first terminal at the shoe of the flash unit for transmitting the output from the aperture signal forming circuit;
    5. a second terminal at the shoe of the flash unit connected to the selected impedance means by the selection means;
  (B) A camera including:

1. a shoe, a third terminal at the shoe of the camera and connected to the first terminal when the flash unit is coupled to the camera;
2. a fourth terminal provided at the shoe of the camera and connected to the second terminal when the flash unit is coupled to the camera;
2. a light measuring circuit for producing an output corresponding to the brightness of an object to be photographed;
4. a diaphragm with an aperture, an aperture control circuit for controlling the aperture;
5. a shutter, a shutter control circuit for controlling the shutter time, said shutter control circuit having daylight shutter time control means for controlling the shutter time based on a variable shutter setting and flash shutter time control means for controlling the shutter time for flash;
6. a constant voltage circuit for producing a constant voltage, said selected impedance means being connected to the constant voltage circuit through said second and fourth terminals when the camera and flash unit are connected for producing one of said selector signals at the fourth terminal;
7. an electric switching circuit having an input connected to said fourth terminal, first switching means connected to said light measuring circuit and said aperture control circuit, said switching means connected to said third terminal and said aperture control circuit, third switching means connected to said daylight shutter time control means and shutter control circuit, said fourth switching means connected to said flash shutter time control means and said shutter control circuit, said switching circuit being responsive to the levels of current at the input for actuating said first and third switching means in response to the first selector signal and actuating the second and fourth switching means in response to the third selector signal.

19. A system as in claim 18, wherein said constant voltage circuit is coupled to the aperture control circuit to bias the aperture control circuit with the constant voltage.

20. A photographic system comprising:
(a) a camera including:
 (1) an exposure control circuit operable in a daylight mode for controlling an exposure to be suitable for daylight photography and a flash mode for controlling the exposure to be suitable for flash photography,
 (2) a voltage forming circuit for providing an output voltage,
 (3) a voltage terminal connected to the voltage forming cirucit, and
 (4) a current detecting circuit connected to said exposure control circuit for detecting current values flowing at said voltage terminal and for changing the mode of the control circuit to the flash mode when said detecting circuit detects that the current flowing at the voltage terminal is at a prescribed value, and
(b) a flash device, including:
 (1) an input terminal connectable to said voltage terminal for receiving the voltage at said voltage terminal;
 (2) a current forming circuit for coupling to said voltage forming circuit and producing current with the prescribed value when the input terminal is connected to the voltage terminal so as to produce the current with the prescribed value at the voltage terminal, and
 (3) said current forming circuit including switching means to be operated when preparation is made for flash photography for causing said current forming circuit to form said prescribed current when said switching means is operated.

21. A photographic system comprising:
(a) a camera, including:
 (1) a shutter control circuit operable in a first mode for controlling a shutter time to be suitable for daylight photography and a second mode for controlling a shutter time to be suitable for flash photography,
 (2) a voltage forming circuit for providing an output voltage,
 (3) a voltage terminal connected to the voltage forming circuit, and
 (4) a current detecting circuit connected to said shutter control circuit for detecting a value of current flowing at said voltage terminal and for changing the mode of the shutter control circuit to the second mode when the value of current flowing at the voltage terminal is at a prescribed level, and
(b) a device for flash photography, including:
 (1) an input terminal connectable to said voltage terminal for receiving the voltage at said voltage terminal,
 (2) switching means for performing a switching operation when energy stored at a flash capacitor reaches a predetermined value, and
 (3) a current forming circuit connected to the input terminal and having impedance means, said current forming circuit being arranged for impressing the output voltage from the voltage forming circuit onto the impedance means through the voltage terminal and the input terminal when the input terminal and the voltage terminal are connected and when the switching means performs a switching operation so as to cause flow of current with the prescribed value from the voltage forming circuit through the impedance means through said terminals.

22. For use with a camera having a voltage source circuit, a camera terminal for carrying a voltage of the voltage source circuit, a detecting circuit for detecting a value of current flowing at said terminal, and an exposure control circuit for controlling exposures so they are suitable for flash photography when current at a prescribed value is detected by the detecting circuit, a device for use in flash photography, comprising:
(a) an input terminal connectable to the camera terminal;
(b) switch means to be switched for flash photography, and
(c) a current forming circuit connected to said terminal, said voltage being impressed on said current forming circuit through said terminals when the switch means is switched so that current flows from the voltage source circuit to the current forming circuit through the terminals at the prescribed value.

23. For use with a camera having a voltage source circuit, a camera terminal for carrying the voltage of the voltage source circuit, a detecting circuit for detecting a value of current flowing at said terminal, and a shutter time control circuit which controls a shutter time to a value suitable for flash photography when current at the prescribed value is detected by the detecting circuit; a device for use with a flash, comprising:
(a) an input terminal connectable to said camera terminal; and
(b) a current forming circuit having an impedance circuit and connected to said input terminal for impressing the voltage at the voltage source circuit on the impedance circuit through the terminals, so as to cause flow of said current with the prescribed value to the impedance circuit through the terminals.

24. A photographic system, comprising:
(a) a camera including:
  (1) a diaphragm defining means,
  (2) a daylight diaphragm signal forming circuit for producing a signal corresponding to a diaphragm value for daylight photography,
  (3) a control circuit for controlling said diaphragm defining means based on an input signal,
  (4) a voltage source circuit for producing an output voltage to cause the control circuit to perform a diaphragm control operation upon receiving a voltage corresponding to the output voltage,
  (5) a carrier terminal for carrying a voltage from the voltage source circuit,
  (6) a control terminal connected to said control circuit,
  (7) a switching circuit operable in a daylight mode for supplying a signal from the daylight diaphragm signal forming circuit to said control circuit in a daylight mode and operable in a flash mode for supplying a signal from said control terminal to said control circuit, and
  (8) a current detecting circuit which detects a value of current flowing through said carrier terminal and switches the switching circuit from the daylight mode to the flash mode when said value of current detected is at a prescribed value, and
(b) a device usable for flash photography, including:
  (1) a receiver terminal for receiving the output voltage from the carrier terminal,
  (2) a current forming circuit connected to said receiver terminal for receiving the output voltage through said carrier and receiver terminals and producing a flow of current from the voltage source circuit through the carrier and receiver terminals so as to produce the current with the prescribed value at the carrier terminal,
  (3) a flash diaphragm signal forming circuit connected to said receiver terminal to form a signal with a value corresponding to a diaphragm aperture value for flash photography using the output voltage at the receiver terminal as the reference voltage, and
  (4) a transmitter terminal connectable to the second terminal for transmitting said signal output from the flash diaphragm signal forming circuit.

25. A photographic system according to claim 24, wherein said device includes a flash tube, a main capacitor, and switching means for detecting the charge at the main capacitor and switching when the level of the charge reaches a prescribed value, and said current forming circuit has an impedance circuit connected to said switching means so that the output voltage is impressed on the impedance circuit by switching of the switching means and forms the prescribed value of current based on the impedance value of the impedance means.

26. A photographic system, comprising:
(a) a flash unit including:
  (1) a reference terminal for carrying a voltage applied thereto,
  (2) an aperture signal forming circuit for forming an output voltage corresponding to a diaphragm aperture value suitable for flash photography using the voltage at the reference terminal as a reference voltage;
  (3) a current forming circuit including first impedance means, second impedance means, and selector means for selecting the first or second impedance means, said circuit being connected to said reference terminal, the voltage at the reference terminal being applied to the impedance means selected by the selector means for regulating current to the reference terminal on the basis of the selected one of said impedance means, so that said current forming circuit produces a current having a first value when the first impedance means is selected and a second value when the second impedance means is selected, and
  (4) a voltage terminal for carrying the voltage of the aperture signal forming circuit, and
(b) a camera, including:
  (1) a voltage source circuit for producing a voltage,
  (2) a source connected terminal connected to said voltage source circuit and being connectable to the reference terminal,
  (3) a current detecting circuit for detecting a value of current flowing at the source connected terminal through the reference terminal,
  (4) an output terminal being connectable to the second terminal, and
  (5) an exposure control circuit connected to said output terminal for controlling a diaphragm based on the output voltage at the output terminal when the current detecting circuit detects the first current value and fixes a shutter at a first shutter time for flash photography, and for controlling the diaphragm based on the output voltage at the output terminal when the second current value is detected and fixes the shutter at a second shutter time for flash photography.

27. For use with a camera which has a voltage source circuit for providing a voltage, a carrier terminal for carrying the voltage at said voltage source circuit, a current level detecting circuit for detecting a level of current flowing at the carrier terminal, an operating terminal, and a diaphragm control circuit for controlling a diaphragm, so that the control circuit performs a diaphragm control operation using a voltage corresponding to the voltage from the voltage source circuit as an operating voltage, and the control circuit performs a diaphragm control operation based on the voltage at an operating terminal when a prescribed current level is detected by the detecting circuit, a device usable in a flash, comprising:
(a) a circuit connected terminal connectable to the carrier terminal,
(b) a current forming circuit connected to said circuit connected terminal so that the voltage at the voltage source circuit is impressed on said current forming circuit through the carrier and circuit connected terminals, and so as to cause current flow from the voltage source circuit through said terminals of the prescribed level at the carrier terminal, (c) a diaphragm signal forming circuit connected to said circuit connected terminal and forming an output voltage corresponding to a diaphragm aperture value for flash photography using the voltage at the voltage source circuit through the carrier and circuit connected terminals as a reference voltage, and (d) a fourth terminal for carrying the voltage output of said diaphragm signal forming circuit and connectable to the operating terminal.

28. A device according to claim 27, further comprising a capacitor to store flash energy for a flash tube and switching means for performing a switching operation when the energy stored at the capacitor reaches a prescribed level so that the current forming circuit is connected to the switching means and is actuated by the switching operation of said switching means.

29. A device according to claim 27, wherein the diaphragm signal forming circuit includes an amplifying circuit to which the voltage from the voltage source circuit is applied as a reference voltage through the third terminal.

30. A camera usable with a device for flash photography, in which said device has a connector terminal and a current forming circuit which is connected to said terminal and has an impedance circuit, and wherein the current forming circuit introduces current at a prescribed level through said terminal when a voltage is applied to the terminal, said camera comprising:

(a) a voltage source circuit for providing a voltage, (b) an output terminal which is connected to said voltage source circuit and is connectable to the connector terminal in the device so that the voltage is applied to the current forming circuit through the terminals and the current of the prescribed level flows from the voltage source circuit into the device through the terminals, (c) a current level detecting circuit for detecting a level of current flowing at said output terminal, and (d) a shutter control circuit connected to said current level detecting circuit operable in a daylight mode for controlling a shutter time to be suitable for daylight photography and a flash mode for controlling the shutter time to be suitable for flash photography, the shutter control circuit being arranged to operate in the flash mode when the current level detecting circuit detects the prescribed current level.

31. A camera usable with a device for flash photography, wherein said device has an input terminal, a diaphragm voltage forming circuit connected to said input terminal, an output terminal for carrying the output of the diaphragm voltage forming circuit, and a current forming circuit connected to said input terminal, wherein the diaphragm voltage forming circuit establishes a voltage corresponding to a diaphragm aperture value for flash photography at the output terminal using the voltage input through the input terminal as a reference voltage, and the current forming circuit has a voltage applied thereto through the input terminal so as to introduce current at a prescribed level through the input terminal, said camera comprising:

(a) a voltage source circuit for providing a voltage;

(b) a first camera terminal connected to said voltage source circuit and connectable to said input terminal, (c) a second camera terminal connectable to said output terminal;

(d) a current level detecting circuit for detecting a level of current flowing at the first terminal, and (e) a diaphragm control circuit for actuating using the voltage of the voltage source circuit as a reference voltage and for controlling a diaphragm based on the voltage established at the diaphragm voltage forming circuit and applied to the second terminal when the current level detecting circuit detects current at a prescribed level.

32. A flash photography system comprising:

(a) a camera including:

(1) a diaphragm defining means, (2) a control circuit for controlling said diaphragm defining means based on an input voltage, (3) a power source circuit for supplying voltage and actuating said control circuit using a voltage corresponding to the voltage from the power source circuit as a reference voltage, (4) a carrier terminal for carrying the voltage at the power source circuit, and (5) an applying terminal for applying the input voltage to the control circuit, and (b) a device for flash photography, including:

(1) input means for receiving the voltage from the first terminal, (2) a diaphragm signal forming circuit to which said voltage through the input means is applied for forming a voltage corresponding to a diaphragm aperture value for flash photography based on the value of said applied voltage, and (3) output means for carrying the voltage from the diaphragm signal forming circuit and arranged so that the applying terminal transmits the voltage output through the output means to the control circuit.

33. A flash photography system according to claim 32, in which the diaphragm signal forming circuit includes diaphragm information means exhibiting predetermined diaphragm aperture information suitable for flash photography, and said circuit forms an output voltage corresponding to said diaphragm aperture value based on said diaphragm aperture information.

34. A flash photography system according to claim 32, in which the diaphragm signal forming circuit forms a voltage corresponding to a diaphragm aperture value for flash photography using the voltage applied by the input means as a reference voltage.

35. A flash photography system according to claim 32, in which the control circuit includes a comparator which has the voltage from the power source circuit applied thereto as a reference voltage and at a same time has a voltage corresponding to the value of voltage applied thereto, said diaphragm defining means being controlled by the output from the comparator.

36. A flash photography system, comprising:

(a) a camera including:

(1) diaphragm defining means for defining aperture values, (2) a control circuit for controlling said diaphragm defining means based on an input voltage, (3) a power source circuit for supplying a voltage, said control circuit being arranged to perform a diaphragm control operation in response to a supply of a voltage corresponding to the voltage from the power source circuit,
(4) a first terminal for exhibiting a voltage from the power source circuit, and
(5) a second terminal for applying said input voltage to said control circuit, and (b) a device for flash photography, including:
(1) input means for connection to the voltage from said first terminal,
(2) a diaphragm signal forming circuit connected to said input means and having a voltage supplied thereto through the input means to form a voltage corresponding to a diaphragm aperture value for flash photography based on the value of said voltage supplied thereto, and
(3) an output terminal which is connectable to said second terminal for carrying the voltage at the diaphragm signal forming circuit, so that the second terminal transmits the voltage output through the output means to the control circuit as an input voltage.

37. A device used in flash photography and usable with a camera which has a power supply circuit for providing an output voltage and a control circuit for controlling a diaphragm based on an input voltage, wherein the control circuit is actuated using a voltage based on the voltage output from the power supply circuit as a reference voltage and performs a diaphragm control operation based on said input voltage, said device comprising:
(a) input means to sense said output voltage,
(b) a diaphragm signal forming circuit, to which the output voltage is applied through the input means, and forming an output voltage corresponding to a diaphragm aperture value for flash photography using said output voltage as a reference voltage, and
(c) output means for applying the output voltage from the signal forming circuit so as to apply a voltage based on the output voltage from the output means to the control circuit as the input voltage when the device is used with the camera for flash photography, and so that the diaphragm is controlled on the basis of the output voltage.

38. A device used in flash photography according to claim 37, in which the diaphragm signal forming circuit has an amplifying circuit to which the output voltage input through the input means is applied as a reference voltage, said amplifying circuit having impedance means connected thereto for establishing diaphragm aperture information, so that the amplifying circuit forms an output voltage based on the diaphragm aperture value of the impedance means using the output voltage being received through the input means as a reference voltage.

39. A device according to claim 38, in which the current forming circuit has an impedance circuit and the voltage is introduced to the current forming circuit from the voltage source circuit as the voltage is applied to the impedance circuit.

40. A device used in flash photography and usable with a camera which has a power source supply circuit for providing an output voltage and a control circuit for controlling a diaphragm based on an input voltage, wherein said control circuit performs a diaphragm control operation by a supply of the output voltage from the power supply circuit, said device including:
(a) input means to respond to said output voltage,
(b) a diaphragm signal forming circuit connected to said input means and having diaphragm information means with predetermined diaphragm aperture information suitable for flash photography, wherein said signal forming circuit has the output voltage applied thereto through the input means so as to establish an output voltage with a value corresponding to said diaphragm aperture value and to the output voltage value being applied through the input means, and
(c) an output means for carrying the output voltage of the diaphragm signal forming circuit, so that supplying a voltage based on the output voltage from the output means to the control circuit as the input voltage at a time of flash photography, results in performing a diaphragm control operation based on said output voltage.

41. A device which is used in flash photography and is usable with a camera which has connectors for receiving a power source and a control circuit for controlling diaphragm defining means based on an input voltage, wherein the control circuit has an actuating voltage therefor supplied thereto from the power source connectors, said device comprising:
(a) input means for receiving the voltage from said power source,
(b) a diaphragm signal forming circuit for forming an output voltage corresponding to a diaphragm aperture value for flash photography based on the voltage at the power source at the input means, and
(c) output means for carrying the output voltage from said signal forming circuit.

42. A device which is used in flash photography and is usable with a camera which has a voltage source circuit for providing a voltage, a terminal for carrying said voltage, a current level detecting circuit for detecting a level of current flowing at said terminal, and an exposure control circuit for controlling an exposure to a value suitable for daylight photography in a first mode and controlling an exposure to a value suitable for flash photography in a second mode, wherein the exposure control circuit controls the exposure in the second mode when current with a prescribed level is detected by the current level detecting circuit, said device comprising:
(a) a connection terminal connectable to said camera terminal,
(b) a current forming circuit which is connected to said terminal and has the voltage from the voltage source circuit applied thereto through the connection terminal, so as to introduce current at a prescribed level thereto from the voltage source circuit through the terminal and make said current forming circuit operable when preparation for flash photography is made, and so as to cause flow of current at a prescribed level at the terminal of the camera for flash photography and to place the exposure control circuit in the second mode.

* * * * *